United States Patent
Wantschik

(10) Patent No.: US 8,072,752 B2
(45) Date of Patent: Dec. 6, 2011

(54) ELECTRICAL CABINET WITH TWO COOLING CHANNELS

(75) Inventor: Michael Wantschik, Karlsruhe (DE)

(73) Assignee: ADC GmbH, Berlin (DE)

( * ) Notice: Subject to any disclaimer, the term of this patent is extended or adjusted under 35 U.S.C. 154(b) by 49 days.

(21) Appl. No.: 12/301,484

(22) PCT Filed: Apr. 26, 2007

(86) PCT No.: PCT/EP2007/003671
§ 371 (c)(1),
(2), (4) Date: Jun. 3, 2009

(87) PCT Pub. No.: WO2007/134695
PCT Pub. Date: Nov. 29, 2007

(65) Prior Publication Data
US 2009/0296321 A1    Dec. 3, 2009

(30) Foreign Application Priority Data

May 19, 2006  (DE) .................. 10 2006 024 682

(51) Int. Cl.
*H05K 7/20* (2006.01)
*H05K 5/00* (2006.01)

(52) U.S. Cl. ........ 361/695; 361/678; 361/690; 361/694; 454/184; 312/223.1; 312/236

(58) Field of Classification Search .......... 361/676–678, 361/679.48–679.5, 679.54, 690, 692, 694–695, 361/704; 165/47, 48.1, 53, 54, 185; 454/184; 312/223.1, 236
See application file for complete search history.

(56) References Cited

U.S. PATENT DOCUMENTS

| | | | | |
|---|---|---|---|---|
| 2,654,583 A | * | 10/1953 | Treanor | 165/104.34 |
| 4,263,963 A | * | 4/1981 | Ghiraldi | 165/47 |
| 4,609,126 A | * | 9/1986 | Janda | 220/374 |
| 4,949,218 A | * | 8/1990 | Blanchard et al. | 361/696 |
| 5,467,250 A | * | 11/1995 | Howard et al. | 361/696 |
| 5,603,376 A | * | 2/1997 | Hendrix | 165/104.34 |
| 5,832,988 A | * | 11/1998 | Mistry et al. | 165/103 |
| 5,886,296 A | * | 3/1999 | Ghorbani et al. | 174/50 |
| 6,062,665 A | * | 5/2000 | Schneider et al. | 312/265.6 |
| 6,067,223 A | | 5/2000 | Diebel et al. | |
| 6,082,441 A | | 7/2000 | Boehmer et al. | |
| 6,088,225 A | | 7/2000 | Parry et al. | |

(Continued)

FOREIGN PATENT DOCUMENTS

DE        8807768 U1 *  1/1989

(Continued)

OTHER PUBLICATIONS

Machine Translation of DE29605555U1 obtained from from Google language tools at www.google.com/language_tools, Sep. 19, 1996.

*Primary Examiner* — Robert J Hoffberg
(74) *Attorney, Agent, or Firm* — Merchant & Gould P.C.

(57) ABSTRACT

The invention relates to an electrical cabinet (1) for receiving electrical and/or electronic and/or optoelectronic devices, in particular low-current distribution devices, which is particularly suited for installation outdoors, comprising an inner cabin (2) and an outer cabin (3), a first cooling channel (12) and a second cooling channel (23) being configured to be bordering externally on boundary surfaces (6) of the inner cabin (2) and separated from each other.

20 Claims, 3 Drawing Sheets

U.S. PATENT DOCUMENTS

| | | | | |
|---|---|---|---|---|
| 6,119,768 A | * | 9/2000 | Dreier et al. | 165/104.33 |
| 6,149,254 A | | 11/2000 | Bretschneider et al. | |
| 6,164,369 A | * | 12/2000 | Stoller | 165/104.33 |
| 6,598,668 B1 | * | 7/2003 | Cosley et al. | 165/104.32 |
| 6,657,861 B2 | * | 12/2003 | Irmer | 361/695 |
| 6,704,198 B2 | * | 3/2004 | Replogle et al. | 361/690 |
| 6,833,991 B2 | * | 12/2004 | Van Gaal | 361/690 |
| 6,877,551 B2 | * | 4/2005 | Stoller | 165/47 |
| 6,889,752 B2 | * | 5/2005 | Stoller | 165/47 |
| 7,059,149 B2 | * | 6/2006 | Wahlberg et al. | 62/407 |
| 7,604,534 B2 | * | 10/2009 | Hill | 454/184 |

FOREIGN PATENT DOCUMENTS

| | | |
|---|---|---|
| DE | 2 96 05 555 | 9/1996 |
| DE | 196 09 845 | 5/1997 |
| DE | 196 23 677 | 12/1997 |
| DE | 198 12 117 | 9/1999 |
| DE | 101 19 095 | 10/2002 |
| DE | 20 2004 017338 | 2/2005 |
| DE | 20 2005 002849 | 6/2005 |
| DE | 20 2005 018777 | 4/2006 |
| EP | 0 810 704 A2 | 5/1997 |
| EP | 100 23 52 | 10/2001 |
| GB | 2 262 190 | 6/1993 |
| JP | 2001267774 A * | 9/2001 |
| JP | 2005-093793 | 4/2005 |
| JP | 2009124074 A * | 6/2009 |
| SU | 1707798 A1 * | 1/1992 |
| WO | WO 99/08354 | 2/1999 |

* cited by examiner

ELECTRICAL CABINET WITH TWO COOLING CHANNELS

This application is a National Stage Application of PCT/EP2007/003671, filed 26 Apr. 2007, which claims benefit of Serial. No. 10 2006 024 682.9, filed 19 May 2006 in Germany and which application(s) are incorporated herein by reference. To the extent appropriate, a claim of priority is made to each of the above disclosed applications.

BACKGROUND OF THE INVENTION

The invention relates to an electrical cabinet for accommodating electrical and/or electronic and/or optoelectronic installations, which is suitable in particular for installation outdoors and comprises an inner box and an outer box. A weak-current distribution installation may be, for example, a telephone installation having associated power supply devices and outgoing and incoming cable connection devices for a specific physical area.

Such electrical cabinets need to satisfy various conditions. Firstly, they should protect the electrical or electronic components of the installation against mechanical influences. In addition, the electrical cabinets should provide the operating conditions for the electrical and electronic or optoelectronic installations in the interior of the inner box which are required for fault-free operation.

It is firstly necessary to protect the installations against external influences, such as dust, moisture or vermin. The inner box is therefore well sealed off from the environment during operation. In order to ensure electromagnetic compatibility (EMC), the inner box generally has a metallic casing, which likewise requires a conductive seal with virtually no gaps. The electrical, electronic and/or optoelectronic installations generate heat during operation. This heat needs to be dissipated from the inner box in order to avoid overheating of the installations. An air flow is generally formed in the interior of the inner box, in the case of which warm air rises upwards. Owing to the air flow forming in the interior of the inner box, the heat is at least partially guided towards the peripheral faces of the inner box. At least part of the generated heat can be dissipated via said peripheral faces.

EP 1 002 352 B1 has disclosed a generic electrical cabinet, in which an intermediate space is formed between an inner box and an outer box. The electrical cabinet is designed such that air can flow into the intermediate space from below, is heated at the peripheral faces of the inner box and as a result rises and exits again in an upper region of the electrical cabinet through exit openings in the outer box. Owing to the air circulation in the intermediate space between the inner box and the outer box, the peripheral faces of the inner box are cooled and therefore the heat generated by the electrical installations in the inner box is dissipated from the electrical cabinet.

In this case, the intermediate space between the inner box and side walls of the outer box is delimited at the top by an intermediate lid. Active elements, for example fans, are arranged in openings in the inter-mediate lid, with the result that cold air is sucked in through the essentially vertical intermediate spaces between the inner box and the outer walls of the outer box, exits through the openings in the intermediate lid and is deflected laterally by an upper cover, which protrudes laterally beyond the side walls of the outer box, and is guided through a gap to the outside, which gap is formed between the upper cover, which protrudes beyond the side wall, and the side wall of the outer box.

Although the known electrical cabinets provide a certain amount of cooling of the peripheral faces of the inner box and thereby cooling of the interior of the inner box, electrical cabinets with improved cooling performance are required in order to be used, in particular, in areas which have a particularly unfavorable climate and have a particularly high degree of insulation or a particularly high ambient air temperature.

SUMMARY OF THE INVENTION

The invention is based on the technical object of providing an electrical cabinet of the type mentioned initially which provides improved cooling performance.

In the case of an electrical cabinet of the type mentioned initially, the invention in this case provides for a first cooling channel and a second cooling channel to be formed separately from one another on the outside, adjacent to peripheral faces of the inner box, and for the first cooling channel to comprise a cooling section adjacent to an upper peripheral face of the inner box. This makes it possible to guide a cooling channel which is as cold as possible or ensures a high cooling fluid throughput at the points in the electrical cabinet at which particularly high temperatures occur. As a result, more effective cooling of the inner box takes place, as a result of which it is possible for it to be used in areas with a relatively high ambient temperature or with installations which have a relatively high thermal output.

At least one first cooling channel and one second cooling channel are therefore provided which adjoin the peripheral faces of the inner box, i.e. comprise at least one section, which passes along the peripheral face. This section is referred to as the cooling section. Heat produced in the interior of the inner box can therefore be emitted to a cooling fluid located in the cooling section of the cooling channel by the peripheral faces, which seal the inner box off from fluid exchange. In the cooling section, a wall which is possibly designed to be separate from the inner peripheral face to be cooled, is in good thermal contact with this peripheral face.

The first cooling channel and the second cooling channel do not need to jointly adjoin one of the peripheral faces of the inner box from the outside. In general, either the first or the second cooling channel adjoins each of the peripheral faces of the inner box. However, there are also embodiments in which both the first and the second cooling channel adjoin one of the peripheral faces from the outside. In addition, the first cooling channel or the second channel does not need to adjoin each of the peripheral faces. It is therefore possible for there to be peripheral faces which are adjoined neither by the first cooling channel nor by the second cooling channel. These peripheral faces may be uncooled. As an alternative, embodiments are possible in which at least one further cooling channel is formed which adjoins these peripheral faces from the outside.

With a separated design, two cooling channels are envisaged in which cooling flows form during operation which are separated from one another adjacent to the inner box, i.e. do not permit any cooling fluid exchange in this region. In addition, it is necessary for the electrical cabinet to be capable of being operated such that cooling fluid which has been heated in the first cooling channel does not then flow through the second cooling channel along one of the peripheral faces. The same likewise applies to further cooling fluid which has been heated in the second cooling channel. This further cooling fluid is also guided by the separated formation of the cooling channels such that it does not then again flow past one of the peripheral faces of the inner box in the first cooling channel.

A separated design of the first and second cooling channel makes it possible for an unheated cooling fluid to flow in the first cooling channel and for a further likewise unheated cooling fluid to flow into the second cooling channel. The cooling fluid and the further cooling fluid can flow into or be sucked into the electrical cabinet, for example, via a common cooling fluid inlet region. It is likewise possible for the cooling fluid which has been heated in the first cooling channel and the second cooling fluid which has been heated separately in the second cooling channel to flow out or be blown out via a common outlet region. The first and the second cooling channel, however, are in any case separated from one another such that cooling fluid which has already been heated in the respective other cooling channel does not flow in or is not sucked in during correct operation in the interior of the electrical cabinet. However, it is possible for the heated cooling fluid and the further heated cooling fluid to flow out jointly in a common outlet region.

The highest temperatures at the peripheral faces of the inner box occur at an upper peripheral face. The reason for this is the fact that the air circulation in the interior of the inner box drives warm air towards the upper peripheral face, which outputs at least part of the thermal energy to the upper peripheral face at this point.

The inner box, which comprises a lid as an upper peripheral face, which lid closes off the inner box at the top and is adjoined by the first cooling channel, is hereby cooled more effectively, particularly on the upper peripheral face. This is achieved by virtue of the fact that the inner box comprises a lid as an upper peripheral face, which lid closes off the inner box at the top and is adjoined by the first cooling channel.

A preferred embodiment of the invention provides for the first cooling channel to comprise the cooling section, which adjoins the upper peripheral face of the inner box, and to comprise both a fluid inlet and a fluid outlet in an upper region of the electrical cabinet, the fluid inlet and the fluid outlet preferably being arranged above the upper peripheral face and/or at the level of the upper peripheral face of the inner box in one of the circumferential walls of the outer box or a cover region. The fluid inlet and the fluid outlet of the first cooling channel are therefore preferably arranged in a side wall, a front wall or a rear wall.

In a preferred embodiment, the first cooling channel is formed completely above the inner box. A base wall of the first cooling channel can form the upper peripheral face of the inner box, however.

In general, an embodiment is preferred in which the lid of the inner box is at the same time a peripheral wall of the first cooling channel, at least for a large section of length of the first cooling channel. In one preferred embodiment, a base wall of the first cooling channel forms the upper peripheral face of the inner box. The upper peripheral face and lid of the inner box is advantageously produced from metal in order to ensure effective thermal conduction from the interior to the first cooling channel. Provision may also be made for heat sinks or cooling elements, which protrude into the first cooling channel, to be arranged on the lid. These heat sinks or cooling elements have a cooling fluid flow flowing around them which is formed in the first cooling channel during operation, with the result that optimum heat transfer to the cooling fluid is possible. Such elements for increasing the surface areas of the upper peripheral faces may protrude into the interior of the inner box. Here, they are used for absorbing the heat and for thermal conduction to the cooling elements protruding into the first cooling channel. This makes further improved heat dissipation possible. If the upper peripheral face of the inner box and the wall, which adjoins the inner box, of the first cooling channel are not designed to be common, a thermally conductive paste or the like is preferably arranged between them.

A particularly good throughput of cooling fluid results in an embodiment in which the first cooling channel extends from a side wall of the electrical cabinet to an opposite side wall of the electrical cabinet, with the result that, during operation, a first cooling fluid cycle is formed, in which a cooling fluid enters one side wall of the electrical cabinet through one or more first fluid openings, at least partially flows past at least one of the peripheral faces of the inner box and absorbs output heat and exits again at the opposite side wall of the electrical cabinet through one or more second fluid openings. The first cooling channel is therefore preferably formed along a transverse direction of the electrical cabinet. The first cooling channel preferably has a rectangular cross section, a long edge of the rectangle coinciding with the upper peripheral face of the inner box. Other cross-sectional shapes are conceivable in which, however, preferably one profile edge in each case coincides with the upper peripheral face of the inner box. Arranging the first cooling channel from a side face to the opposite side face of the electrical cabinet allows for a linear throughflow of the first fluid channel. In addition, the incoming flow path of the cooling fluid, until it flows past the upper peripheral face of the inner box, is closely related to the path length which the flow of cooling fluid follows along the upper peripheral face of the inner box. The same applies to the outgoing flow path. In one preferred embodiment, the first cooling channel therefore passes essentially horizontally through the electrical cabinet.

In general, electrical cabinets are particularly preferred in which the first cooling channel comprises an incoming flow section and an outgoing flow section, whose length in each case is short in comparison with a length of the cooling section. In these embodiments, in each case a particularly effective supply of cold cooling fluid and effective removal of the heated cooling fluid are ensured. The incoming flow section and the outgoing flow section are regarded as those sections of a cooling channel via which cooling fluid is guided towards a cooling section or away from the cooling section.

Particularly effective cooling is attained if the incoming flow section and the outgoing flow section of the cooling section of the first cooling channel, which adjoins the upper peripheral face, do not adjoin one of the circumferential walls of the inner box. This means that the electrical cabinet can be operated such that, in the first cooling channel, a fluid flow of the cooling fluid is formed in which cold cooling fluid enters the first cooling channel from the outside, flows along at least part of the upper peripheral face and is heated, and then the heated cooling fluid flows out of the electrical cabinet without flowing along a further one of the peripheral faces of the inner box to the upper peripheral face when flowing in or flowing away. Flowing along a peripheral face also comprises flowing along a wall of the cooling channel which is formed separately from the peripheral face, but runs adjacent to the peripheral face along this peripheral face and is in thermal contact with it. Adjacent means that there is a common contact face. A cooling channel or a section thereof adjoins a face if it extends along the face such that heat exchange is possible via a touching-contact face or adjoining face formed hereby. A plane, which is formed parallel to an upper side face of a square and is in touching contact with this upper side face, in this sense does not adjoin one of the other lateral side faces of the square, although a line of touching contact in this case exists between the lateral side face and the plane.

A particularly effective cooling performance is achieved in an embodiment in which the first cooling channel is designed such that the cooling fluid in the first cooling channel, during operation, flows over a large part of a surface, preferably the entire surface, of the upper peripheral face of the inner box, the large part of the surface flowing over more than half of the surface, more preferably more than two thirds and most preferably the entire surface of the upper peripheral face.

Particularly preferred are embodiments in which, in contrast to embodiments of electrical cabinets in accordance with the prior art, the center of the upper peripheral face at which the highest temperatures generally occur is in any case effectively cooled. A large part of the surface preferably comprises a center of the surface of the upper peripheral face.

In order to ensure, at any time, a reliable flow of cooling fluid, in one particularly preferred embodiment provision is made for the first cooling channel to comprise a first active element, in particular a fan, which brings about, maintains and/or assists a flow of the cooling fluid during operation. This makes regulated cooling possible by means of regulation of the first active element. For example, the first active element only needs to be operated if a threshold value temperature is exceeded in the interior of the inner box.

A separate formation of the first and the second cooling channel makes it possible to form and to regulate cooling flows separately from one another in the two cooling channels. It is thus possible, in particular, to realize a cooling flow along the upper peripheral face with a fluid throughput which differs from a fluid throughput in the second cooling channel, which cools the circumferential walls. It is thus possible, for example, to realize an actively driven flow in the first cooling channel, while a "natural" flow arising owing to the further cooling fluid being heated along the circumferential walls is used in the second cooling channel.

In one preferred embodiment of an electrical cabinet, provision is made for the second cooling channel to comprise one or more intermediate spaces, which is or are formed between the inner box and the outer box along circumferential walls, which are peripheral faces of the inner box. The second cooling channel therefore provides cooling of the circumferential walls of the inner box. In addition, this arrangement means that the insulation acting on the outer box and leading to the peripheral faces of the outer box being heated is likewise cooled by the cooling fluid in the second cooling channel. As a result, a heat input owing to the sun into the interior of the inner box is prevented or avoided completely.

The electrical cabinet is advantageously designed such that the second cooling channel comprises one or more fluid entry openings in a lower region of the electrical cabinet and comprises fluid exit openings in an upper region, preferably above the upper peripheral face of the inner box, on a front side and/or a rear side of the electrical cabinet. In the case of such a refinement, a fluid flow through the second cooling channel is brought about purely owing to the heating of the cooling fluid in the second cooling channel at the peripheral faces of the inner box or the outer box. An arrangement of the fluid exit openings at the front and/or rear side of the electrical cabinet means that the exiting heated cooling fluid of the second cooling cycle, which is formed in the second cooling channel, is not sucked directly into the first cooling channel if said first cooling channel has first fluid openings in the side wall.

The circulation in the second cooling channel can be improved by an intermediate cover being arranged, preferably above the first cooling channel, such that the intermediate space or the intermediate spaces between the circumferential walls of the inner box and the circumferential walls of the outer box of the second cooling channel is or are delimited at the top, with the result that, during operation, a fluid flow, which is directed upwards along the circumferential walls of the inner box, is brought about, maintained and/or assisted by means of a second active element, in particular a further fan, which is arranged in at least one opening in the intermediate cover. Beneath the intermediate cover, the second fluid channel therefore has a closed-off space which has fluid entry openings in the lower region. These fluid entry openings may be provided in the circumferential walls of the outer box or be designed such that the outer box does not abut an area of ground on which the electrical cabinet is arranged. In such a case, a gap forms between the inner box and the outer box in the form of a fluid entry opening. In the intermediate space which is closed off at the top, the cooling fluid is sucked in by the second active element arranged in the intermediate cover. The second active element can likewise be operated such that the cooling fluid is sucked in through the fluid exit openings in the upper region of the electrical cabinet and is blown in through the intermediate cover, with the result that a flow of cooling fluid, which is directed downwards, is formed along the circumferential walls of the inner box, and the cooling fluid, heated, exits from the fluid entry openings again. The terms fluid entry opening and fluid exit opening only specify the corresponding purpose of the openings which they refer to for a flow direction. When the further cooling fluid enters the second cooling channel in the upper region of the electrical cabinet and a downwardly directed flow is formed along the circumferential walls of the inner box, it is possible to achieve a reduction in noise.

In one particularly preferred embodiment, in which the intermediate cover is arranged above the first cooling channel, with the result that a fluid flow forming during operation in the second cooling channel at least partially flows around peripheral faces of the first fluid channel, which do not adjoin the inner box or one of the opposite side faces, a situation is achieved in which not only the inner box but also the first cooling channel is largely protected against the effect of insulation or a different input of heat via the outer box by means of the first cooling cycle. This makes it possible to achieve particularly optimum climatization in the interior of the inner box.

An outer cover is advantageously provided which delimits the second cooling channel at the top. Optimum flow in the second cooling channel is achieved by the fact that the intermediate cover falls away downwards towards the front side and/or falls away downwards towards the rear side. As a result, a cooling fluid flow, which flows from the bottom upwards, between a front wall of the outer box and a front wall of the inner box, is guided in an optimum manner to an opening, which is preferably arranged in the center of the intermediate cover and in which the second active element is preferably arranged. The same applies to a cooling fluid flow in the intermediate space between a rear wall of the inner box and a rear wall of the outer box. In order to guide a cooling fluid flow into the intermediate spaces between the side walls of the inner box and the outer box, which points upwards, around the first cooling channel, flow-guiding apparatuses, preferably flow guide plates, can be arranged beneath the first cooling channel. In addition, owing to the described design of the intermediate cover, it is possible to achieve a situation in which the fluid outlet openings arranged above the intermediate cover on the front and/or rear side of the electrical cabinet can be located at the same height as the first and second fluid openings of the first cooling channel on the opposite side walls of the electrical cabinet.

In order to facilitate assembly in the interior of the inner box, provision is preferably made for the inner box and the outer box each to comprise an element which can be opened, preferably a door, at least on one of the sides, preferably the front side, of the electrical cabinet. Embodiments are also possible in which the element, which can be opened, of the inner box is fixed to the element, which can be opened, of the outer box, with the result that the inner box is opened at the same time as the element, which can be opened, of the outer box is opened. Improved sealing can generally be achieved, however, if the element, which can be opened, of the inner box is formed separately from the element, which can be opened, of the outer box.

A particularly flexible design of the electrical cabinet can be achieved if the inner box comprises a mounting frame which is planked. There is therefore greater play when installing electrical installations, in particular when the electrical cabinet is constructed.

The inner box and/or the outer box are generally produced from metal or plastic, in particular foamed plastic. In order to achieve EMC shielding of the inner box, it is necessary at least to clad the inner box with a metal foil on an inner or outer side.

A flexible and easily transportable electrical cabinet is achieved if the electrical cabinet is in the form of a kit. As a result, in particular cabinets having different heights can use common bases and cover elements. The first cooling channel may be arranged, for example, in an intermediate element, which is placed on top, beneath the circumferential walls.

The described electrical cabinets are preferably designed such that the side wall and the opposite side wall are designed such that the electrical cabinet can be installed adjacent to a further identical electrical cabinet in such a manner that, during operation, a common first cooling cycle is formed in the electrical cabinet and the further identical electrical cabinet. This means that identical electrical cabinets can be installed next to one another such that a common first cooling channel is formed. This is possible in a particularly simple manner since the cooling channel extends from one side wall to the opposite side wall. It is therefore likewise advantageously provided for the fluid exit openings of the second cooling channel to be arranged on the front and/or rear side of the electrical cabinet. As a result, when electrical cabinets are arranged next to one another in a row, none of the fluid exit openings of the electrical cabinet are blocked, which would result in reduced cooling performance.

In accordance with one further aspect of the invention, an arrangement of electrical cabinets of the type just described is proposed, in which provision is made for the electrical cabinets to be arranged in a row such that, during operation, a common first cooling cycle is formed. As a result, the just described advantages are achieved. Despite a plurality of electrical cabinets being arranged next to one another in a row, a sufficient cooling fluid throughput through the first cooling channel of any electrical cabinet is ensured. This is because the first cooling channels each only have a short length and a relatively large throughflow cross section. In addition, the first cooling channels are preferably linear, with the result that a fluid conductance is high. This ensures that, in particular when the first active elements are used, a sufficiently high cooling fluid throughput is ensured by the identical electrical cabinets which are arranged next to one another. Such an arrangement has proved to be particularly advantageous in those areas in which, for example, a large number of end subscribers of a telephone distribution system are provided in a confined physical area and only limited space is available for installing the electrical cabinets. This is particularly the case in town or city centers in which large office buildings stand on streets. If the electrical cabinets are installed in such an area outdoors in an area which is freely accessible to maintenance personnel, only a very limited amount of space is generally available for installing the electrical cabinets on a pavement located in front of high-rise buildings.

BRIEF DESCRIPTION OF THE DRAWINGS

The invention will be explained in more detail below using a preferred exemplary embodiment with reference to a drawing, which comprises the following figures.

DETAILED DESCRIPTION OF THE PREFERRED EMBODIMENTS

Figure 1:
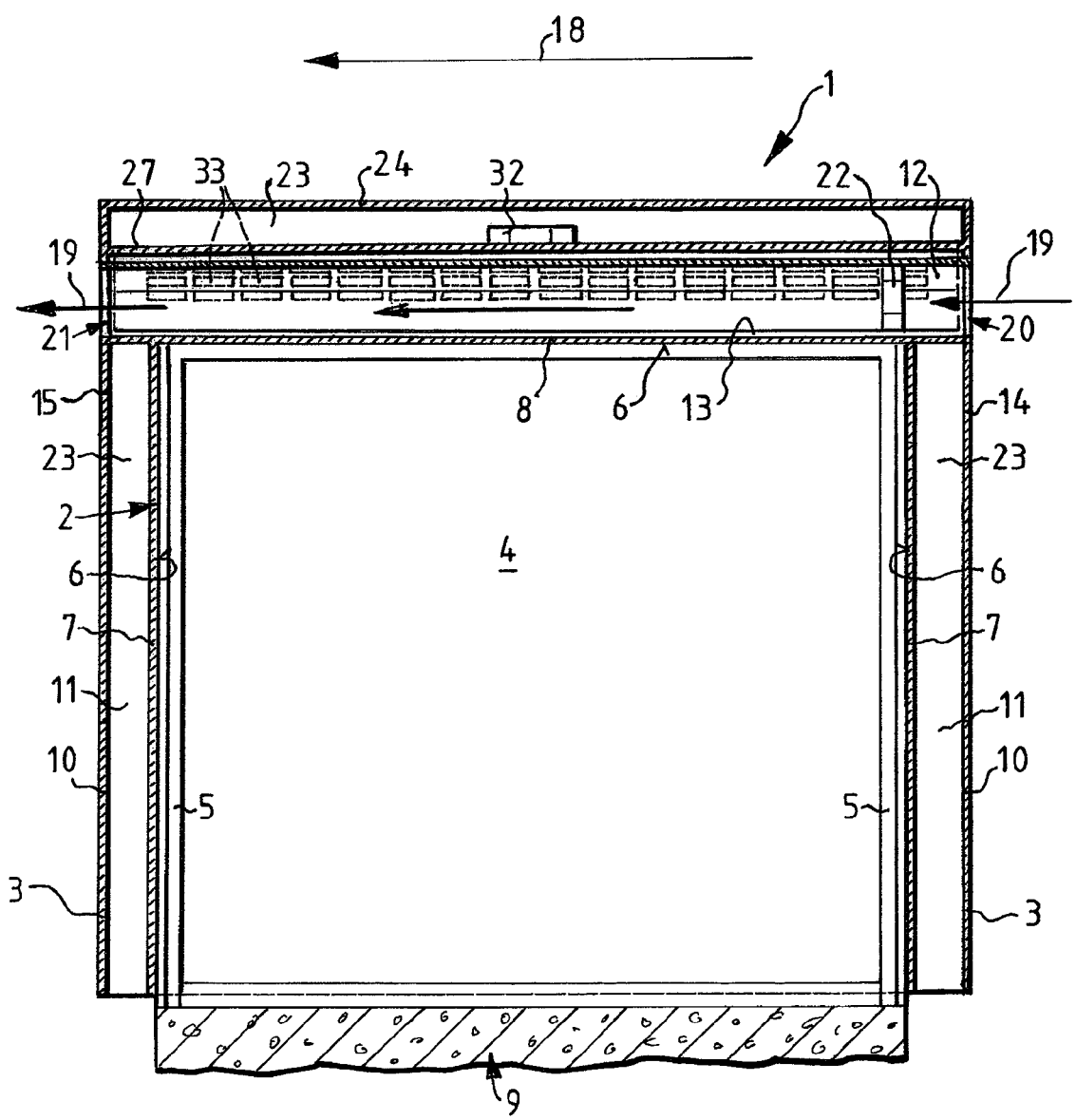
FIG. 1 shows a schematic illustration of an electrical cabinet in a view from the front.

FIG. 1 illustrates a schematic front view of an embodiment of an electrical cabinet 1. The electrical cabinet 1 comprises an inner box 2 and an outer box 3. The inner box 2 encloses an interior 4, in which electrical, electronic and/or optoelectronic installations can be accommodated. These installations are, in particular, weak-current distribution installations, as are used in communications engineering.

The inner box 2 comprises a mounting frame 5, on which, firstly, the installations located in the interior 4 are fixed and, secondly, the peripheral faces 6 of the inner box 2 are fitted. The peripheral faces 6 comprise circumferential walls 7 on the sides (lateral sides, front side and rear side) and an upper peripheral face 8, which closes off the inner box 2 in the form of a lid at the top. The mounting frame 5 is fitted to a lower side 9 on the ground. In other embodiments, provision may be made for the inner box 2 and/or the outer box 3 to be fixed on a base which is completely or partially recessed into the ground. Cables are guided from the lower side 9 into the interior 4 through the mounting frame 5. In order to prevent pests from entering through the ground and to achieve complete EMC shielding, the inner box 2 is generally likewise sealed off with planking towards the lower side 9. It is also possible for closed bases to be used which merely have openings, which can be sealed, for incoming and outgoing cables.

The interior 4, which is also referred to as the functional space, is sealed off from fluid exchange by the peripheral faces 6.

The outer box 3 surrounds the inner box 2, the circumferential walls 10 of the outer box 3 being arranged spaced apart from the circumferential walls 7 of the inner box 2. In order to maintain good stability of the electrical cabinet 1, the outer box 3 and the inner box 2 are connected at several points via connection elements (not illustrated). As a result, it is possible for an intermediate space 11 between the circumferential walls 10 of the outer box 3 and the circumferential walls 7 of the inner box 2 to be split into several intermediate spaces. The distance between the circumferential walls 10 of the outer box 3 and the circumferential walls 7 of the inner box 2 ensures that there is in each case an air cushion between said walls. Thermal radiation, in particular insulation, acting on the circumferential walls 10 of the outer box 3 from the outside therefore does not result in the inner box 2 being heated, since the air cushions in the intermediate space 11 between the circumferential walls 7 of the inner box 2 and the circumferential walls 10 of the outer box 3 act as an insulating layer.

The outer box 3 and inner box 2 form a double-walled electrical cabinet 1.

The heat generated in the interior 4 of the inner box 2 by the electrical, electronic and/or optoelectronic installations (not illustrated) installed therein brings about air circulation in the interior 4. Warm air rises upwards in the interior of the box 4 and results in the upper peripheral face 8 in the form of a lid being heated. In order to achieve effective heat dissipation from the components of the installations, active means and an air-guiding face may be provided in the interior and be used for controlling and regulating an air flow in the interior.

In order to be able to effectively dissipate the heat which is incident on the upper peripheral face 8 of the inner box 2 from the electrical cabinet 1, a first cooling channel 12 is provided. This cooling channel 12 directly adjoins the upper, outer peripheral face 8. Said peripheral face 8 is generally firstly the lid of the inner box 2 and secondly a base wall 13 of the first cooling channel 12. In one advantageous refinement, provision is made for the upper peripheral face 8 of the inner box 2 to be formed by the base wall 13.

The first cooling channel 12 extends from a side wall 14 to an opposite side wall 15. As can be seen from FIG. 2, which illustrates a schematic side view of the electrical cabinet 1 shown in FIG. 1, the first cooling channel 12 has a square cross section. A depth 16 of the first cooling channel 12 preferably corresponds to a depth 17 of the inner box 2. In a longitudinal direction 18, the first cooling channel 12 extends linearly along a transverse direction of the electrical cabinet 1, through said electrical cabinet 1. A cooling fluid 19, generally ambient air, is sucked into the first cooling channel 12 through first fluid openings 20. The first fluid openings 20 are located in the side wall 14. The initially cold cooling fluid 19 flows past the upper peripheral wall 8 of the inner box 2 and is heated. The heated cooling fluid 19 is blown out through second fluid openings 21, which are located in the opposite side wall 15. In order to bring about, regulate and/or assist a flow of cooling fluid 19, a first active element 22 is provided in the first cooling channel 12, said active element 22 generally being in the form of a fan. Heat sinks may be arranged on the base wall 13 or the upper peripheral face 8 of the inner box 2 in order to bring about improved heat transfer to the cooling fluid 19. The cross section of the first cooling channel 12 may also assume any other desired shape, an outer peripheral face of the first cooling channel 12 at the same time being intended to be the upper peripheral face 8 of the inner box 2 (for example comprises said upper peripheral face 8) or being thermally conductively connected to said upper peripheral face 8.

A section of a cooling channel which extends along one of the peripheral faces 6 of the inner box 2 is referred to as the cooling section. Sections which supply cooling fluid to this cooling section from outside the electrical cabinet are referred to as incoming flow sections. Accordingly, sections through which heated cooling fluid flows out of the electrical cabinet toward the outside from the cooling section are referred to as outgoing flow sections. Incoming flow sections and outgoing flow sections of a cooling section can themselves be at least partially in the form of cooling sections. It is preferred, however, as in the embodiment in FIGS. 1 and 2 and in the embodiment in FIGS. 3 and 4 described further below, if the incoming and outgoing flow sections of the cooling sections cooling the upper peripheral face of the inner box are not in the form of cooling sections.

In order to be able to dissipate, in addition and in an improved manner, the heat which is generated in the interior 4 of the inner box 2 and is output, owing to the circulation prevailing therein, at least partially to the circumferential walls 7 of the inner box 2, a second cooling channel 23 is provided. The second cooling channel 23 comprises the intermediate space 11, which is formed between the circumferential walls 10 of the outer box 3 and the circumferential walls 7 of the inner box 2. The second cooling channel 23 is delimited at the top by an upper cover 24. A further cooling fluid 25, which is likewise generally ambient air, flows into the second cooling channel 23 through fluid entry openings 26 in a lower region. The fluid entry openings 26 may be formed in the circumferential walls 10 of the outer box 3, in a lower region thereof. In the embodiment illustrated in FIGS. 1 and 2, the fluid entry openings 26 are formed by gaps which form on the lower side 9 of the electrical cabinet 1 if the circumferential walls 10 do not abut the area of ground on which the electrical cabinet 1 is fixed.

Provided in the second cooling channel 23 is an intermediate cover 27 which extends from a front side 28 to a rear side 29 over a total inner depth 30 of the electrical cabinet 1. The intermediate cover 27 extends along a width of the outer box 3 from the side wall 14 to the opposite side wall 15. As a result, the intermediate space 11 between the circumferential walls 7 of the inner box 2 and the circumferential walls 10 of the outer box 3 as well as a volume located above this, in which the first cooling channel 12 is located, are delimited at the top. The intermediate cover 27 comprises at least one opening 31, through which the further cooling fluid 25 can flow upwards through the intermediate cover 27 once it has been heated on the inner circumferential walls 7 of the inner box 2. A second active element 32 is preferably arranged on or in the opening 31, which active element 32 may likewise be in the form of a fan. The heated further cooling fluid 25 of the second cooling channel 23 is then guided from the upper cover 24 to fluid exit openings 33 in the front side 28 and/or the rear side 29 of the electrical cabinet 1.

The intermediate cover 27 is preferably downwardly beveled towards the front side 28 and the rear side 29 of the outer box 3, with the result that the fluid exit openings 33 through which the further cooling fluid 25 exits once it has been heated can be arranged approximately at the same height as the first and second fluid openings in the side wall 14 and the opposite side wall 15.

Figure 2:
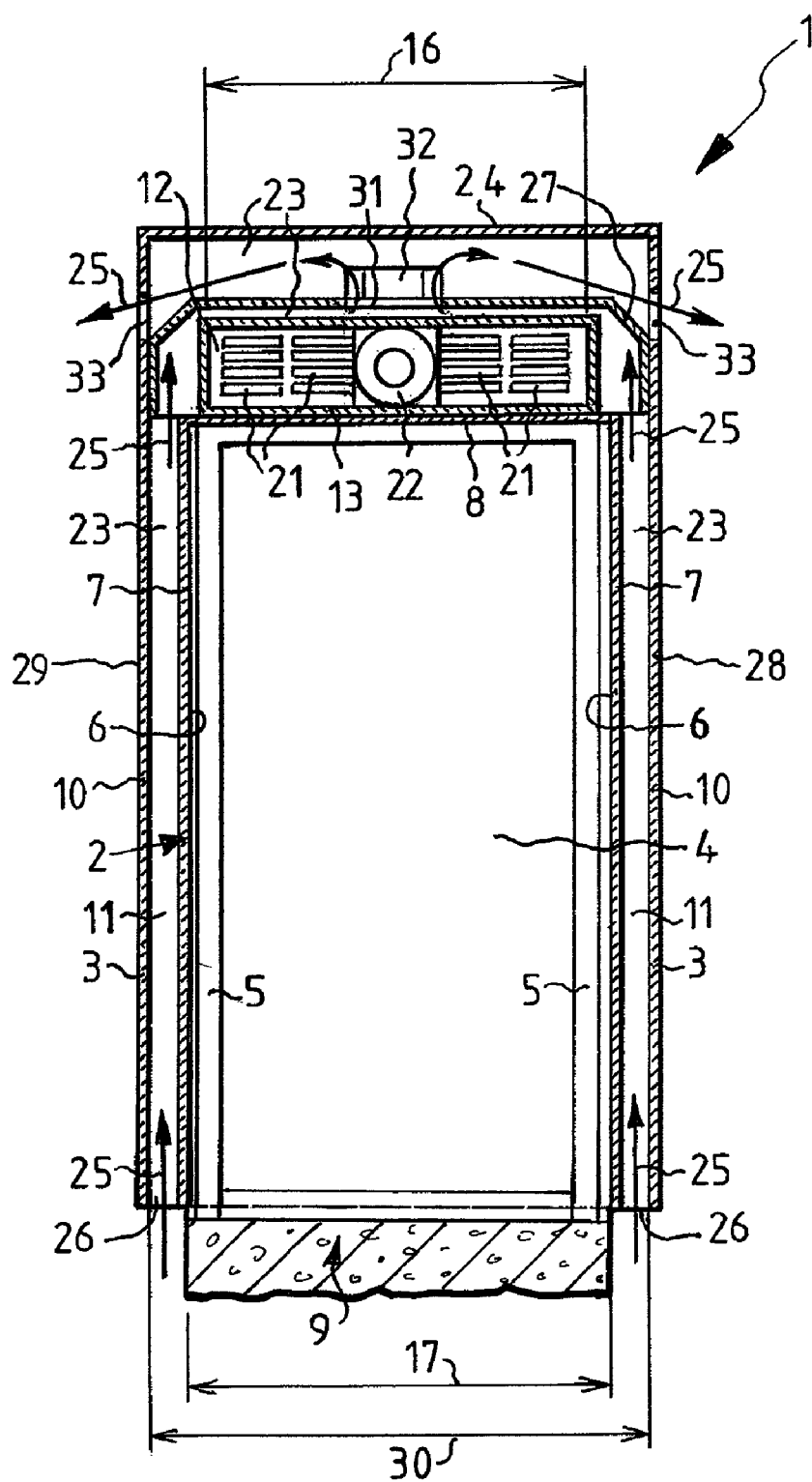
FIG. 2 shows a schematic view of the electrical cabinet shown in FIG. 1 in a side view.

As can be seen in particular from FIG. 2, the first cooling channel 12, with the exception of the points at which the side wall 14 and the opposite side wall 15 and the common wall face come into contact with the inner box 3, is completely surrounded by the second cooling channel 23. This ensures that no heat is radiated in or there is no heat input onto the first cooling channel 12 or the inner box 2 directly from the outside via the outer box 3.

In the second cooling channel 23, the further cooling fluid 25 enters cold at the fluid entry openings 26, flows upwards along the circumferential walls 7 of the inner box 2 and the circumferential walls 10 of the outer box 3, flows around the first cooling channel 12 and flows to the opening 31 in the intermediate cover 27 and then flows between the intermediate cover 27 and the upper cover 24 towards the fluid exit openings 33.

The arrangement of the first cooling channel 12 in such a way that the first cooling fluid 19 can move linearly from the side wall 14 to the opposite side wall 15 makes it possible to arrange a plurality of identical electrical cabinets 1 next to one another. As a result, a common first cooling channel 12 is formed in the adjacent electrical cabinets 1. As a result of the fact that the second cooling channel 23 only has fluid exit openings in the front side 28 and/or the rear side 29 of the electrical cabinet 1, no fluid exit openings 33 are blocked by such an arrangement.

In order to be able to carry out assembly work in the interior 4 of the electrical cabinet 1, both the inner box 2 and the outer box 3 preferably have one or more elements (not illustrated), which can be opened and which are generally in the form of doors or flaps, on the front side 28 of the electrical cabinet 1.

The circumferential walls 10 of the outer box 3 may be produced in the form of segments from metal or foamed plastic, preferably polycarbonate foam. The circumferential walls 10 may be taken up to the upper cover 24 and themselves also comprise the fluid exit openings 33. In another embodiment, the circumferential walls 10 of the outer box 3 end approximately at a height which corresponds to the height of the inner box 2. In this embodiment, the first cooling channel 12 and the intermediate cover and the fluid exit openings 33 can be arranged in an intermediate part, on which the upper cover 24 is placed. The intermediate part may, however, also be integrated in the upper cover 24, resulting in an upper part.

In principle, various possible ways of creating a corpus for the outer box 3 and a corpus for the inner box 2 are known to a person skilled in the art. In particular, the electrical cabinet 1 may be in the form of a kit, with the result that it can be transported more easily and individual parts can be used for electrical cabinets 1 of different sizes. For example, an upper part (just described) with different circumferential walls 10 may be used in order to construct electrical cabinets 1 of different heights.

Figure 3:
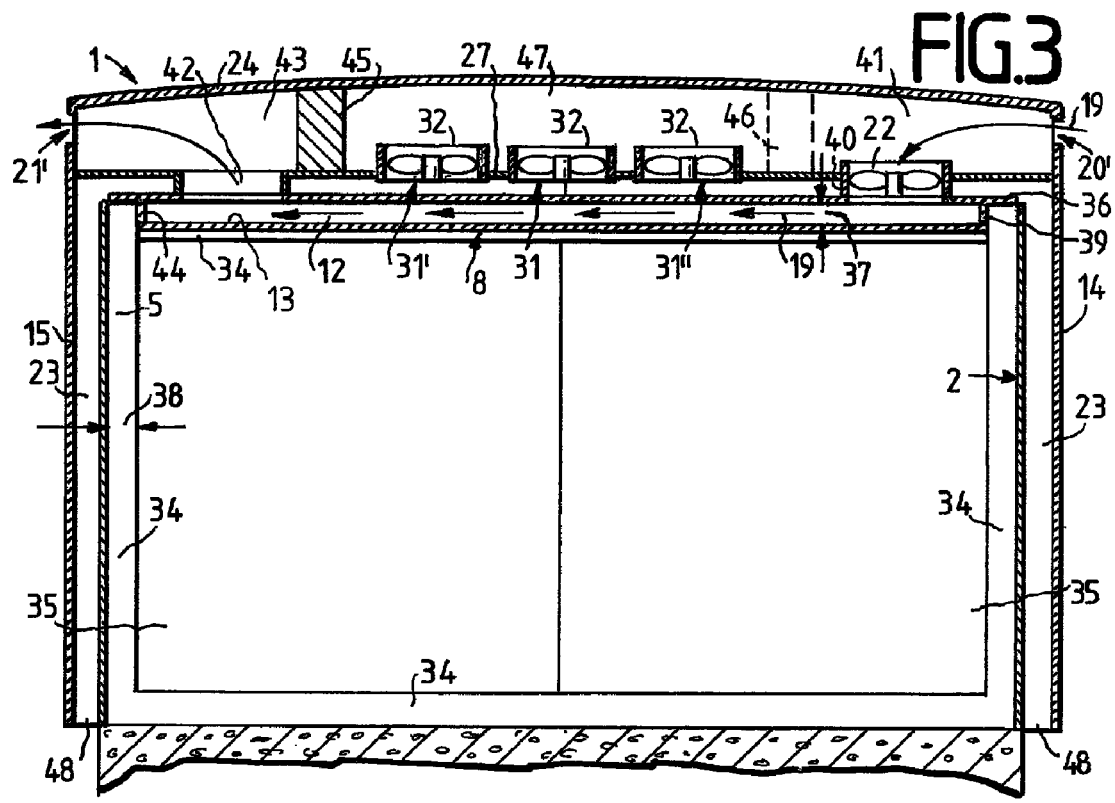
FIGS. 3 and 4 show schematic basic views of an embodiment of an electrical cabinet.
Figure 4:
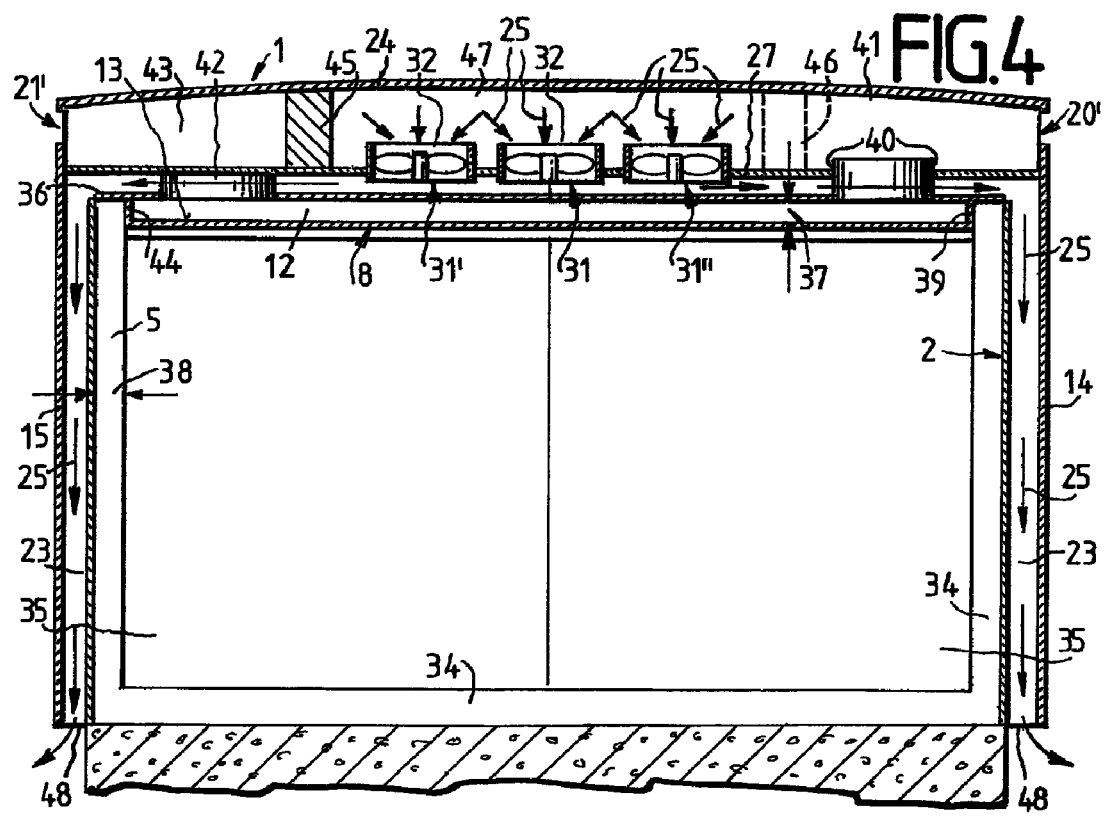

FIGS. 3 and 4 show schematic views of a further embodiment of an electrical cabinet 1. FIGS. 3 and 4 show the same view of the electrical cabinet 1, but different cooling fluid flows are illustrated. Identical technical features in FIGS. 3 and 4 are identified by the same reference symbols as in FIGS. 1 and 2.

The electrical cabinet 1 comprises an inner box 2, which has a mounting frame 5 comprising frame profiles 34 which are screwed to one another. Planking 35 is fitted to circumferential walls of the inner box 2. The base wall 13 of a first cooling channel 12, which is inserted from above into the mounting frame 5, formed from the frame profiles 34, of the inner box 2, is used as the upper peripheral face 8 of the inner box 2. A circumferential, outwardly protruding edge 36 of the cooling channel 12 rests on the frame profiles 34. A height 37 of the first cooling channel 12 in the region of the upper peripheral face 8 of the inner box 2 is in the region of a profile thickness 38 of the frame profiles 34.

In order to suck or blow cooling fluid 19 into the cooling channel 12, an inlet connection piece 40 is formed at a first end 39 of the cooling channel 12 on an upper side, a first active element 22, in the form of a ventilating fan, being arranged in said inlet connection piece 40. The inlet connection piece 40 connects an inlet region 41 above the intermediate cover 27 to that part of the first cooling channel 12 which passes parallel to the upper peripheral face 8 of the inner box 2. The inlet connection piece 40 seals off the first cooling channel 12 with respect to the second cooling channel 23 beneath the intermediate cover 27. An outlet connection piece 42 connects that part of the first cooling channel 12 which passes parallel to the upper peripheral face 8 of the inner box 2 to an outlet region 43 above the intermediate cover 27 at one end 44, which is opposite the end 39, of that part of the first cooling channel 12 which passes parallel to the upper peripheral face 8 of the inner box 2. The outlet connection piece 42 seals off the first cooling channel 12 beneath the intermediate cover 27 from the second cooling channel 23 in an identical manner to the inlet connection piece 40. The outlet region 43 is separated from the inlet region 41 by means of a partition web 45 above the intermediate cover 27 and beneath the upper cover 24.

The cooling fluid 19 therefore enters the inlet region 41 cold through first fluid openings 20' through a side wall 14 and/or parts of the front side and/or parts of the rear side of the electrical cabinet 1. The cooling fluid 19 is blown into that part of the first cooling channel 12 which passes parallel to the upper peripheral face 8 by the first active element 22 via the inlet connection piece 42, is heated as it flows past the upper peripheral face 8 and then enters the outlet region 43 through the outlet connection piece 42 and flows through second fluid openings 21' through the opposite side wall 15 and/or parts of the front side and/or parts of the rear side of the electrical cabinet 1 once it has been heated. The inlet region 41 can be separated from a further inlet region 47 by a further partition web 46.

While FIG. 3 illustrates a flow of the cooling fluid 19 through the first cooling channel, FIG. 4 illustrates the flow of a further cooling fluid 25 through the second cooling channel 23 of the electrical cabinet 1. Through fluid inlet openings (not illustrated), which are also referred to as gills, the further cooling fluid 25 enters the further inlet region 47 between the upper cover 24 and the intermediate cover 27. If the inlet region 41 is not separated from the further inlet region 47 by the further partition web 46, further cooling fluid 25 likewise passes through the first fluid openings 20' in the region of the inlet region 41 through the side wall 14 and/or the parts of the front side and/or parts of the rear side of the electrical cabinet 1. In the embodiment illustrated, the second active element 32 comprises three fans, which are arranged horizontally over openings 31, 31', 31" in the intermediate cover 27. The further cooling fluid 25 is blown into the region beneath the intermediate cover 27 and is heated as it flows along the circumferential walls of the inner box 2. The heated further cooling fluid 25 then exits from the electrical cabinet 1 through fluid outlet openings 48. It has been proved to be advantageous for the cold cooling fluid 19 and the further cooling fluid 25 to be sucked in through the fluid inlet openings and first fluid openings 20' in the upper region of the electrical cabinet and to be blown through the first cooling channel 12 and the second cooling channel 23, with the result that the further cooling fluid 25 exits through the fluid outlet opening 48 in the lower region of the electrical cabinet 1. This results in a lower load in terms of noise than in an embodiment in which the cooling fluid 19 (cf. FIG. 3) flows through the first cooling channel 12 and the further cooling fluid 25 (cf. FIG. 4) flows through the second cooling channel 23 in opposite directions to the directions illustrated. The reversal of the direction of flow with respect to the embodiment described in only one of the two cooling channels is only possible if the further partition web 46 is provided in order to separate the inlet region 41 and the further inlet region 47 from one another, of which one would then act as the inlet region and the other as the outlet region. Otherwise, either cooling fluid 19, which is heated in the first cooling channel 12, would be blown into the second cooling channel 23 as a further cooling fluid 25 or, vice versa, further cooling fluid 25, which is heated in the second cooling channel, would be blown into the first cooling channel 12 as the cooling fluid 19, which is not desirable.

The embodiment described in FIGS. 3 and 4 is characterized by a particularly low height 37 of that part of the first cooling channel 12 which passes parallel to the upper peripheral face 8. In this embodiment, in which the first active element 22 is in the form of a fan, said fan is likewise installed horizontally, i.e. the fan vanes rotate in a horizontal plane, i.e. in a plane perpendicular to the plane of the drawing in FIGS. 3 and 4.

In preferred embodiments of electrical cabinets, the first cooling channel, which cools the upper peripheral face, is designed such that it is formed completely above the inner box. In this case, a base wall of the first cooling channel can form the upper peripheral face of the inner box, however. Fluid inlet openings and fluid outlet openings are arranged in an upper region of the electrical cabinet, above or at the level of the upper peripheral face of the inner box. As a result, short incoming and outgoing flow sections of the first cooling channel are made possible.

In the embodiment described in FIGS. 3 and 4, the incoming flow section comprises, for example, the inlet region 41 and the inlet connection piece 40. The outgoing flow section comprises the outlet connection piece 42 and the outlet region 43. All sections, including the cooling section, are formed above the inner box 2.

Effective cooling of the upper peripheral face is particularly advantageous in large electrical cabinets since, in the case of these large electrical cabinets, air circulation in the interior which ensures that heated air is primarily guided along the circumferential walls, as is envisaged in the prior art, in order to dissipate the heat from the interior over the circumferential walls, can only be maintained with difficulty.

In addition to the electrical cabinets described in more detail here, a large number of further additional embodiments are conceivable. For example, one embodiment may provide for the circumferential walls to be cooled by the second cooling channel and for the upper peripheral face to be cooled by a further cooling channel, in addition to the first cooling channel. For example, inlet openings in a common inlet region of the first cooling channel and of the further cooling channel could be provided on the front wall and/or rear wall in the cover region in each case in a central region of the front wall and rear wall. One or more fans suck cooling fluid via said openings and guide it into the first cooling channel and the further cooling channel, which each have a cooling section, which extends from the center to one of the side walls, and an outgoing flow section, which has outlet openings in the corresponding side wall and/or in the front and/or rear wall of the electrical cabinet at its edges, preferably in the cover region.

In all described electrical cabinets, the outer box represents the outer housing or the outer cabinet. The inner box is an inner housing or an inner cabinet, which surrounds a functional space from which the heat produced therein cannot be dissipated by convection since no fluid exchange is possible through the peripheral faces.

Reference is made to the fact that the terms "inlet", "entry", "outlet" and "exit" are each selected according to the embodiments illustrated in the respective figures and in accordance with the purpose as regards the cooling fluid flows. However, this means that one or both cooling fluid flows, as has been discussed explicitly, can take place in many cases even in the reverse direction, with the result that the purpose of the technical features in such a case is not identical to the terminology contents of these prefixes. In addition, the terms "inlet" and "entry" and "outlet" and "exit" should in each case be considered synonyms in the context of this description.

List of Reference Symbols
1 Electrical cabinet
2 Inner box
3 Outer box
4 Interior
5 Mounting frame
6 Peripheral faces
7 Circumferential walls of the inner box
8 Upper peripheral face of the inner box
9 Lower side
10 Circumferential walls of the outer box
11 Intermediate space
12 First cooling channel
13 Base wall
14 Side wall
15 Opposite side wall
16 Depth of the first cooling channel
17 Depth of the inner box
18 Longitudinal direction
19 Cooling fluid
20, 20' First fluid openings
21, 21' Second fluid openings
22 First active element
23 Second cooling channel
24 Upper cover
25 Further cooling fluid
26 Fluid entry openings
27 Intermediate cover
28 Front side
29 Rear side
30 Inner depth of the outer box
31, 31', Opening
31"
32 Second active element
33 Fluid exit openings
34 Frame profile
35 Planking
36 Protruding edge
37 Height
38 Profile thickness
39 First end
40 Inlet connection piece
41 Inlet region
42 Outlet connection piece
43 Outlet region
44 Opposite end
45 Partition web
46 Further partition web
47 Further inlet region
48 Fluid outlet openings

The invention claimed is:

1. An electrical cabinet comprising:
   an inner box having a plurality of first circumferential walls that define first peripheral faces, the inner box also having an upper peripheral face;
   an outer box having a plurality of second circumferential walls that define second peripheral faces, the plurality of second circumferential walls being spaced from the plurality of first circumferential walls;
   a first cooling channel formed between the inner box and the outer box, the first cooling channel having a fluid inlet and a fluid outlet in an upper half of the electrical cabinet; and
   a second cooling channel formed between the plurality of first circumferential walls and the plurality of second circumferential walls, the second cooling channel being formed separately from the first cooling channel;
   wherein the first cooling channel comprises a cooling section adjacent to the upper peripheral face of the inner box.

2. The electrical cabinet as claimed in claim 1, wherein the fluid inlet and the fluid outlet are arranged at or above a level of the upper peripheral face of the inner box.

3. The electrical cabinet as claimed in claim 1, wherein the first cooling channel extends from a first side wall of the electrical cabinet to an opposite second side wall of the electrical cabinet, wherein, during operation of the electrical cabinet, a cooling fluid enters the first side wall of the electrical cabinet through one or more first fluid openings, flows past one of the first peripheral faces or the upper peripheral face of the inner box and absorbs output heat, and exits again at the second opposite side wall of the electrical cabinet through one or more second fluid openings.

4. The electrical cabinet as claimed in claim 3, wherein the first cooling channel is configured such that the cooling fluid in the first cooling channel, during operation of the electrical cabinet, flows over a part of a surface of the upper peripheral face of the inner box, the part of the surface comprising a center of the surface.

5. The electrical cabinet as claimed in claim 3, wherein the first cooling channel comprises a first active element, which assists a flow of the cooling fluid during operation of the electrical cabinet.

6. The electrical cabinet as claimed in claim 3, wherein the first side wall and the opposite second side wall are configured such that when the electrical cabinet is installed adjacent to a further identical electrical cabinet, during operation of the electrical cabinet, a common first cooling cycle is formed in the electrical cabinet and the further identical electrical cabinet.

7. The electrical cabinet as claimed in claim 1, wherein a base wall of the first cooling channel forms the upper peripheral face of the inner box.

8. The electrical cabinet as claimed in claim 1, wherein the first cooling channel passes horizontally through the electrical cabinet.

9. The electrical cabinet as claimed in claim 1, wherein the second cooling channel comprises at least one intermediate space formed between the inner box and the outer box along the first peripheral faces of the inner box.

10. The electrical cabinet as claimed in claim 9, wherein an intermediate cover is arranged such that the intermediate space between the plurality of first circumferential walls of the inner box and the plurality of second circumferential walls of the outer box is delimited at a top of the second cooling channel, and wherein a second active element is positioned in at least one opening in the intermediate cover to assist directing a further cooling fluid flow upwards or downwards along the plurality of first circumferential walls of the inner box.

11. The electrical cabinet as claimed in claim 10, wherein the second active element is configured to be operated such that the further cooling fluid flows in a downwardly directed fluid flow along the plurality of first circumferential walls of the inner box.

12. The electrical cabinet as claimed in claim 10, wherein the intermediate cover is arranged above the first cooling channel, wherein the further cooling fluid flow in the second cooling channel, at least to an extent, flows around peripheral faces of the first fluid channel, which do not adjoin the inner box.

13. The electrical cabinet as claimed in claim 10, wherein the intermediate cover extends downwards towards at least one of a front side and a rear side of the electrical cabinet.

14. The electrical cabinet as claimed in claim 1, wherein the second cooling channel comprises one or more fluid entry openings in a lower half of the electrical cabinet and comprises fluid exit openings in the upper half on at least one of a front side and a rear side of the electrical cabinet.

15. The electrical cabinet as claimed in claim 1, wherein an upper cover delimits the second cooling channel at a top of the second cooling channel.

16. The electrical cabinet as claimed in claim 1, wherein the inner box and the outer box each comprise an element which is configured to be opened on at least one of a front side and a rear side of the electrical cabinet.

17. The electrical cabinet as claimed in claim 1, wherein the inner box is planked.

18. The electrical cabinet as claimed in claim 1, wherein the inner box comprises an EMC shield.

19. The electrical cabinet as claimed in claim 1, wherein the inner box and the outer box are produced from metal or foamed plastic.

20. An arrangement of electrical cabinets comprising:
a plurality of electrical cabinets positioned in a row, each electrical cabinet of the plurality of electrical cabinets including a sealed inner box and an outer box enclosing the sealed inner box, the outer box of the each electrical cabinet including opposing side walls, one of the opposing side walls of a first electrical cabinet of the plurality of electrical cabinets facing one of the opposing side walls of an adjacent electrical cabinet of the plurality of electrical cabinets, the each electrical cabinet also including a first cooling channel formed between the inner and outer boxes, the first cooling channel extending along a top of the sealed inner box, and a second cooling channel formed between the inner and outer boxes, the second cooling channel being isolated from the first cooling channel,
wherein the first cooling channel of the first electrical cabinet aligns with the first cooling channel of the adjacent electrical cabinet to form a common first cooling cycle.

\* \* \* \* \*